(12) United States Patent
Sathish

(10) Patent No.: US 8,413,168 B2
(45) Date of Patent: Apr. 2, 2013

(54) METHOD, APPARATUS AND COMPUTER PROGRAM PRODUCT FOR PROVIDING AN EVENT SCHEME FOR CONTEXT MODELS

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 700 days.

(21) Appl. No.: 12/398,702

(22) Filed: Mar. 5, 2009

(65) Prior Publication Data

US 2010/0229186 A1 Sep. 9, 2010

(51) Int. Cl.
*G06F 3/00* (2006.01)
(52) U.S. Cl. ......... 719/318; 717/100; 717/174; 718/100
(58) Field of Classification Search ........................ None
See application file for complete search history.

(56) References Cited

U.S. PATENT DOCUMENTS

| | | | | |
|---|---|---|---|---|
| 2008/0016182 | A1* | 1/2008 | Sathish et al. | 709/219 |
| 2008/0222635 | A1* | 9/2008 | Tommasi et al. | 718/100 |
| 2009/0006992 | A1* | 1/2009 | Gilboa | 715/763 |
| 2009/0013319 | A1* | 1/2009 | Williams et al. | 717/174 |

OTHER PUBLICATIONS

International Search Report and Written Opinion for Application No. PCT/IB2010/000443 mailed Jun. 23, 2010.
Sathish, S. et al., *Context Service Framework for the Mobile Internet*, Proceedings of the International Workshop on System Support for Future Mobile Computing Applications, IEEE, (2006), 8 pages.
W3C Technical Report *Delivery Context: Client Interfaces (DCCI) 1.0, Accessing Static and Dynamic Delivery Context Properties*, W3C Candidate Recommendation, Dec. 21, 2007, [online] [retrieved Jun. 17, 2010]. Retrieved from the Internet: <URL: http://www.w3.org/TR/DPF/>. 34 pages.
European Search Report for Application No. 10 748 396.8, dated Nov. 13, 2012.
Pixley, T.; "Document Object Model Events;" Netscape Communications Corp.; W3C Recommendation; dated Nov. 13, 2000; retrieved on Dec. 10, 2012 from <http://www.w3.org/TR/DOM-Level-2-Events/events.html> 26 pages.

* cited by examiner

*Primary Examiner* — Emerson C Puente
*Assistant Examiner* — Dong Kim
(74) *Attorney, Agent, or Firm* — Alston & Bird LLP

(57) ABSTRACT

An apparatus for providing an event scheme for a context model may include a processor and a memory storing executable instructions that in response to execution by the processor cause the apparatus to at least perform operations including defining an event scheme comprising at least two phases and providing the event scheme for use in a topologically independent context model. One of the at least two phases defined may enable provision of a notification from a consumer application to a data provider and the other of the at least two phases may enable provision of a notification from the data provider to the consumer application. The context model may be configured to provide access by consumer applications to property information of data providers via the context model.

18 Claims, 3 Drawing Sheets

METHOD, APPARATUS AND COMPUTER PROGRAM PRODUCT FOR PROVIDING AN EVENT SCHEME FOR CONTEXT MODELS

TECHNOLOGICAL FIELD

Embodiments of the present invention relate generally to communication interface technology and, more particularly, relate to a method, apparatus, and computer program product for an event scheme for context models such as, for example, Delivery Context Client Interface (DCCI) models.

BACKGROUND

Delivery Context Client Interface (DCCI), which is a World Wide Web Consortium (W3C) specification, is a mechanism through which applications can access device data such as delivery context information using, for example, a Document Object Model (DOM)-like interface. As such, DCCI may act as a consumer interface for web applications (consumers) and providers of data to a tree-like interface. Context data, because of the inherent relationships that such data represents, may be represented in a tree structure. The tree structure represents a hierarchical relation between different context properties where each property may form a node in the tree, and DCCI is an example of such a structure. However, other topological structures in addition to the tree-like structure may also be employed for a consumer interface.

Although DCCI may be useful in providing information to applications about device status, DCCI may currently be considered limited by some due to its dependence on DOM. In this regard, current event models deployed by W3C especially for context models (e.g., DCCI) tend to be heavy in terms of processing (such as supporting all event phases for the same purpose) and are dependent on some DOM features that are not needed such as, for example, redundant event phases, support for document events, user interface (UI) events, mutations and others that are not suitable for context models. Furthermore, DOM events may be too complex for usage in some situations and may lack desirable functionality, such as support for bi-directional communication between data providers and data consumers and topology independent event propagation.

Accordingly, it may be desirable to provide a framework for addressing at least some of the issues discussed above.

BRIEF SUMMARY

A method, apparatus and computer program product are therefore provided for an event scheme for context models. Moreover, some embodiments of the present invention may include a model that provides new semantics to event phases and additional functionalities. Accordingly, for example, redundant processes may be avoided while providing an efficient and lightweight solution to support multiple topologies (e.g., not just tree structures) as well as provide intuitive and efficient event handling.

In one exemplary embodiment, a method of providing an event scheme for a context model is provided. The method may include defining an event scheme comprising at least two phases and providing the event scheme for use in a topologically independent context model. One of the at least two phases defined may enable provision of a notification from a consumer application to a data provider and the other of the at least two phases may enable provision of a notification from the data provider to the consumer application. The context model may be configured to provide access by consumer applications to property information of data providers via the context model.

In another exemplary embodiment, a computer program product for providing an event scheme for a context model is provided. The computer program product includes at least one computer-readable storage medium having computer-executable program code instructions stored therein. The computer-executable program code instructions may include program code instructions for defining an event scheme comprising at least two phases and providing the event scheme for use in a topologically independent context model. One of the at least two phases defined may enable provision of a notification from a consumer application to a data provider and the other of the at least two phases may enable provision of a notification from the data provider to the consumer application. The context model may be configured to provide access by consumer applications to property information of data providers via the context model.

In another exemplary embodiment, an apparatus for providing an event scheme for a context model is provided. The apparatus may include a processor and a memory storing executable instructions that in response to execution by the processor cause the apparatus to at least perform operations including defining an event scheme comprising at least two phases and providing the event scheme for use in a topologically independent context model. One of the at least two phases defined may enable provision of a notification from a consumer application to a data provider and the other of the at least two phases may enable provision of a notification from the data provider to the consumer application. The context model may be configured to provide access by consumer applications to property information of data providers via the context model.

Embodiments of the invention may provide a method, apparatus and computer program product for employment in web based, or other network based operating environment. As a result, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
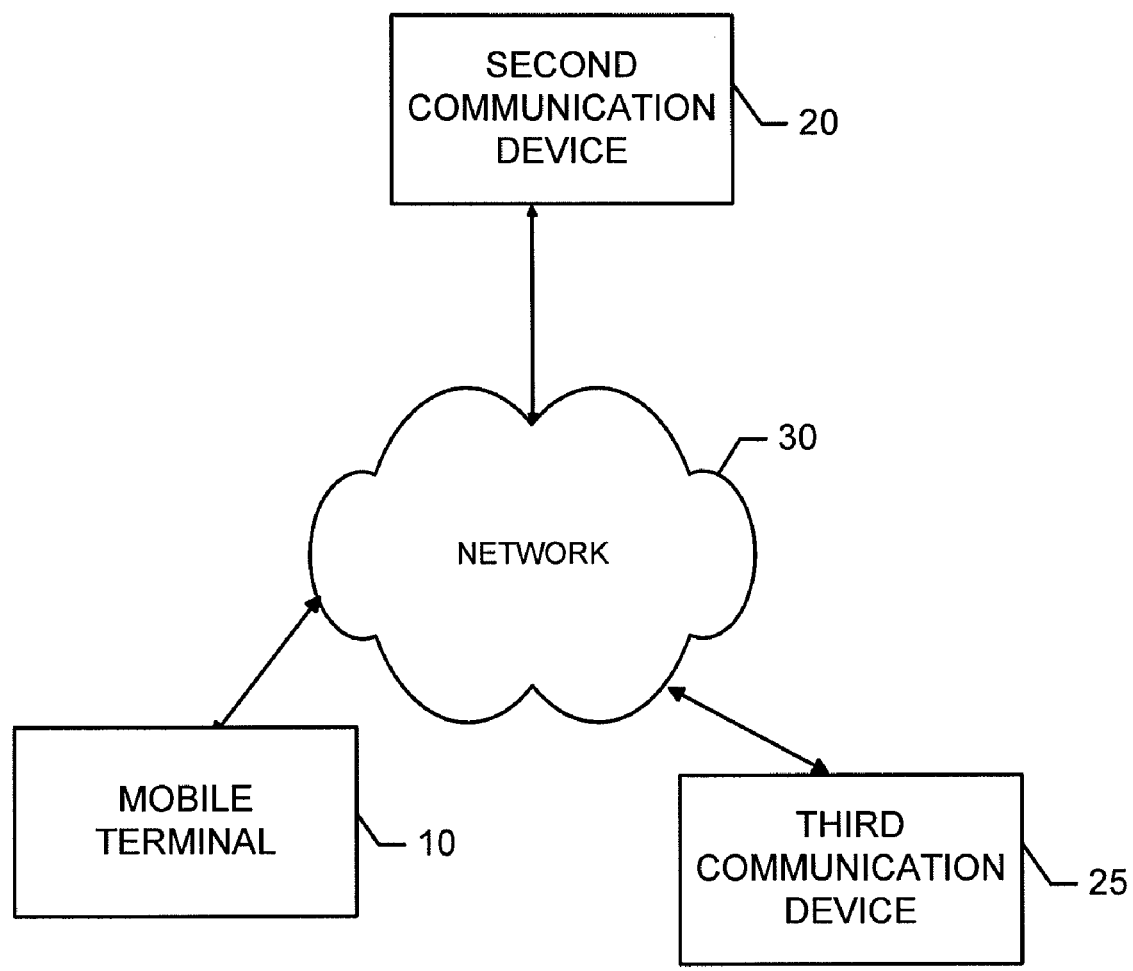
FIG. 1 is a schematic block diagram of a communication system according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein;

rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Electronic devices have been rapidly developing in relation to their communication capabilities. As the capabilities of such devices have increased, applications that are sensitive to the capabilities of the devices have also been developed. Thus, for example, applications that are sensitive to the current operating state or context of devices have been developed. The devices are often able to determine, keep and communicate information about their own current operating state. For example, battery level, available bandwidth, certain device settings, hardware and software capabilities, local ambient light level and many other state related pieces of information may be determined and/or communicated to other devices. In order to communicate information on device operating state to various applications such as, for example, an application associated with accessing the web, an interface may be provided. An example of such an interface is Delivery Context Client Interface (DCCI), which is a World Wide Web Consortium (W3C) specification. DCCI may enable context information, which may be referred to as context information, to be made available to scripts running in web pages within a browser on a device.

Context is generally defined as any information that can be used to characterize the situation of an entity. Context parameters may include parameters related to, for example, environmental context, social context, spatio-temporal context, task context, personal context, terminal context, service context, access context, and/or the like. Context may be used to describe a set of characteristics of a device, a network, user preferences and other aspects that may apply to an interaction between the device and an application (e.g., a web application). Aspects of context could be either static or dynamic. Static aspects may include color resolution, display size, keyboard arrangement or other fixed properties of the device. Dynamic aspects may include properties of the device that may change over time such as current battery level, device orientation, device location, other applications running, and numerous other like characteristics.

As indicated above, DCCI may be a mechanism through which applications can access context information using, for example, a DOM-like interface. Accordingly, applications can register event listeners on property nodes that initiate events based on property or other changes. In this regard, DCCI provides interfaces for applications that utilize context information. DCCI provides a tree-like representation of context data on a device that can be represented in a hierarchical manner conforming to some standard ontology; e.g., Delivery Context Ontology (DCO).

Because of inherent relationships that context information may represent, context information may be represented as a tree structure. The tree structure may represent a hierarchical relationship between different context properties in which each property may form a node in the tree structure. DCCI is one example of such a tree structure, but it should be understood that embodiments of the present invention extend beyond this one example and may be extended to many other data structures that specify relationships between data objects and/or how they can be effectively distributed and shared such as, for example, single backbone structures and mixed backbone-tree structures. A single backbone structure may be an example of a structure in which there is a single message bus and context nodes (e.g., providers) are connected directly to the message bus. In such a structure, traffic flows through the message bus and nodes listen to the bus. In a mixed backbone-tree structure, for example, there can be branches of the message bus directed away from a central bus. A mixed backbone-tree structure may be employed where there could be some level of hierarchy indications for a certain set of properties. With the backbone hierarchy, relations between properties may be contained within metadata and not through their connections. Meanwhile, with the mixed backbone-tree structure, relations may be mostly expressed through metadata, but there can also be connections amongst certain types of properties.

Context may be determined, for example, based on a determination of various context parameters. DCCI uses context information to enable adaptation that permits interaction with various applications while considering device context. In some cases, when devices are brought in proximity to each other in certain networks, such as smart spaces, context information, e.g. information regarding device capabilities, may desirably be shared between such devices so that each device can receive some information about the capabilities of the other device. Some embodiments of the present invention provide a mechanism by which multi-dimensional data spaces may be provided for each object represented. Additionally, some embodiments provide manipulation functions corresponding to the multi-dimensional spaces provided. Although embodiments will be described below in the context of a DCCI related environment, it should be understood that embodiments may also relate to other object based model environments.

DOM events were meant for use in connection with document manipulation and are therefore not particularly suited for use in connection with context models. Accordingly, when current DCCI employs DOM events there may be unintended limits to functionality and inefficiencies introduced that would be desirable to mitigate or eliminate. Accordingly, embodiments of the present invention may provide for an event model associated with an event scheme for employment with a context model. The event models of exemplary embodiments of the present invention may provide for a more efficient and dynamic context model.

FIG. 1 illustrates a generic system diagram in which a device such as a mobile terminal 10 is shown in an exemplary communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ embodiments of the present invention may comprise all the devices illustrated and/or described herein. While several embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In some embodiments, the network 30 may be a P2P network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an exemplary embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an exemplary embodiment, one or more of the devices in communication with the network 30 may employ a context model to assist in providing an interface between applications (e.g., web applications running on the mobile terminal 10 and acting as consumers) and providers (e.g., data providers in the form of network nodes such as the second and/or third communication devices 20 and 25). As such, for example, a consumer application may request information from a provider within the network 30 and any one of the mobile terminal 10 or the second and third communication devices 20 and 25 may host a consumer application while any other one of the mobile terminal 10 or the second and third communication devices 20 and 25 acts as a provider with respect to the consumer application to provide information such as context information to the respective consumer application. The context model may be an object based model in which each provider has an object representation in the model. Thus, the context model may provide consumer applications with access to context data such as dynamic data.

Figure 2:
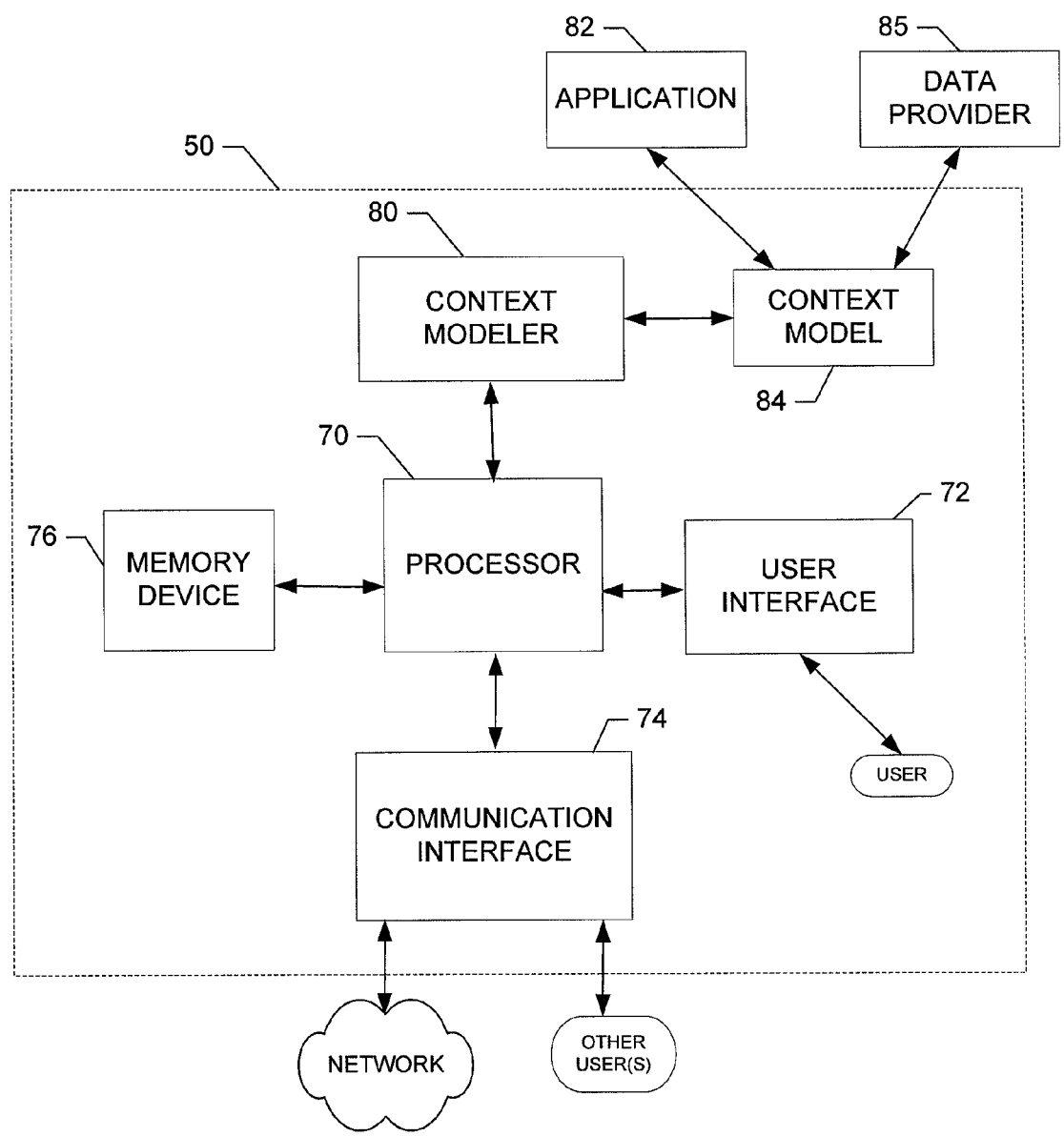
FIG. 2 is a schematic block diagram of an apparatus for providing an event scheme for a context model according to an exemplary embodiment of the present invention.

FIG. 2 illustrates a schematic block diagram of an apparatus for enabling the provision of an event scheme for a context model according to an exemplary embodiment of the present invention. An exemplary embodiment of the invention will now be described with reference to FIG. 2, in which certain elements of an apparatus 50 for providing an event scheme for a context model are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in certain embodiments.

Referring now to FIG. 2, an apparatus 50 for providing an event scheme for a context model is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70, which may otherwise be a general purpose processing element or other functionally configurable circuitry if not for the specific configuration provided by the instructions, to perform the algorithms and operations described herein. However, in some cases, the processor 70 may be a processor of a specific device (e.g., a mobile terminal) adapted for employing embodiments of the present invention by further configuration of the processor 70 by instructions for performing the algorithms and operations described herein.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control a context modeler 80. The context modeler 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the context modeler 80 as described below. Thus, in examples in which software is employed, a device or circuitry (e.g., the processor 70 in one example) executing the software forms the structure associated with such means. In this regard, for example, the context modeler 80 may be configured to provide, among other things, for the generation of a context model including the provision of an event scheme for the context model. As such, the context modeler 80 may develop a context model 84 that may be used to provide a model representation of objects so that information regarding context of the various objects may be provided to calling applications. Moreover, the context modeler 80 may define phases of the event scheme provided by the context model 84 such that the phases support numerous types of topologies such as, for example, tree based hierarchical topologies, single backbone based topologies and/or mixed backbone-tree based topologies.

In some embodiments, the context modeler 80 may be in communication with one or more applications (e.g., application 82) that may act as consumers with respect to device context information provided. Application 82 may be a web application or some other network application for which information about properties associated with the apparatus 50 of FIG. 2 may be useful. As such, in some cases, the application 82 may be in communication with the context modeler 80 via the communication interface 74 (and/or via the processor 70). In an exemplary embodiment, the context model 84 may serve as a communication interface between data providers (e.g., data provider 85) and the application 82. The data provider 85 could be either a local provider or a remote provider (e.g., one of the second and third communication devices 20 and 25), which may act as a source of data. The data provider 85, like the application 82, may be in direct communication with the context modeler 80 (and/or the context model 84), or may establish such communication via the communication interface 74 or the processor 70.

In an exemplary embodiment, the context modeler 80 may be embodied in a computer program product as instructions that are stored in the memory of a communication device (e.g., the mobile terminal 10 and/or the second and third communication devices 20 and 25) and executed by the processor 70. Alternatively, the context modeler 80 may be embodied as software that forms a part of or is installed on middleware, for example, of the communication device. As another alternative, the context modeler 80 may be embodied as the processor 70 (e.g., as an FPGA, ASIC, or the like). The context modeler 80 may be configured to develop a context model (e.g., context model 84) including a model representation of multiple (in some cases all) devices in communication with the communication device (e.g., the mobile terminal 10 and/or the second and third communication devices 20 and 25). Accordingly, when, for example, a communication session is established between the mobile terminal 10 and the second communication device 20 and/or the third communication device 25, the context modeler 80 may be configured to determine a model representation of the second and/or third communication devices 20 and 25 with respect to the content and characteristics of each corresponding device. As such, for example, if the second communication device 20 is a mobile telephone, the context model may include capabilities and other characteristics of the mobile telephone. The context model may include an object registry (e.g., object model) including an object representation of each corresponding object stored in the corresponding device. Accordingly, for each object created at the corresponding device, information about the characteristics, capabilities, data structure, manufacturer, version number, and other like information may be determined by the context modeler 80. In an exemplary embodiment, when an application (e.g., application 82) uses or requests context data, the context modeler 80 is configured to be capable of utilizing the context model 84 to provide a context value through a value interface associated with the context modeler 80.

However, the context modeler 80 according to some embodiments is further configured to provide an event scheme to support the topology of the context model (e.g., tree based, single backbone, mixed backbone-tree, etc.). As such, the context modeler 80 according to some embodiments of the present invention may provide for modified event scheme phases with respect to those DOM event phases associated with typical DCCI implementations. In this regard, according to an exemplary embodiment, the context modeler 80 may be configured to define one or more of at least two new event phases. In some cases, the new event phases defined by the context modeler 80 may replace event phases associated with DOM (e.g., a capture phase, a target phase and a bubbling phase) for the context model 84. In DOM, the capture phase, target phase, and bubbling phase may all be used for at least one common purpose, namely notification of changes to nodes (e.g., data providers). However, the phases defined by the context modeler 80 according to an exemplary embodiment may provide phases with distinct purposes, while also simplifying the context model 84 and enabling notification in the opposite direction (e.g., from consumers to data providers).

As an example, the context modeler 80 may be configured to define new event phases that correspond loosely to phases of DOM. In an exemplary embodiment, the new event phases may be referred to as a "SUB" phase and a "NOTIFY" phase. However, the names of the phases are unimportant relative to the functionality of the respective phases. As such, although each phase will be referred to hereinafter by their respective names, the names are only provided for purposes of simplifying the description of the phases in clear terms, and the names themselves are not limiting.

The SUB phase may correspond loosely to the capture phase in DOM events, while the NOTIFY phase may correspond loosely to the bubbling phase. However, the SUB phase may be used by a subscriber to send notifications to a specific data provider (or providers) of a particular property (or several properties). In some embodiments, the SUB phase may be used only by a consumer property and is fired at the root node. The SUB phase may be sent from a root node and propagate all the way to a bottom leaf node unless a specific property node is identified. In response to identification of a specific property node, the event propagation may stop at the identified specific property node, but passes through all nodes on the path to the specific property node. The path itself and the particulars of how the event is propagated may depend on the topology employed by the context model 84. However, for the SUB phase and the NOTIFY phase, a path for each phase may be defined (e.g., in a specification) for each topology with which the phases may be employed. Thus, for example, for a single backbone based model, the event may pass through the central backbone unless it first encounters an identified property or reaches the last node connected at the bottom of the backbone.

The NOTIFY phase may be used by a provider of a property to send notifications to one or more event listeners up to the root node (e.g., consumer) of a corresponding context topology. For the NOTIFY phase, all events originate from the property node and the NOTIFY phase is fired along a predetermined path up to the root node where the phase terminates. Event handlers attached along the path can check the event, but the event handlers cannot stop propagation of the event to the root node. The propagation of the event may be stopped, in some cases, by an auxiliary secure component by designating a particular node en-route to the root node as an auxiliary root node for a particular type of event or fired by a particular property, depending on the implementation. In situations in which the auxiliary root node is designated, the designation may be used as a back door to improve efficiency. However, in order to protect applications, no application event handler may be enabled to stop propagation of an event. Instead, only a designated node may be enabled to stop event propagation.

Accordingly, while phases of DOM events may be used for notification only to consumers, some embodiments of the present invention provide one particular phase for notification to providers (e.g., the SUB phase) and another separate phase for notification to consumers (e.g., the NOTIFY phase). Another technical characteristic of some embodiments of the present invention is that multiple topology types are supported with a single event scheme. Furthermore, embodiments of the present invention provide improvements in propagation paths and prevention of event flow from providers to consumers, which thereby provides an event flow direction not supported by DOM. In this regard, in the notification from consumers to providers (e.g., the SUB phase), propagation may pass from root to bottom leaf node. Thus, in backbone style topology, no path pre-computation is required so that processing power, memory resources and computation time are reduced. Additionally, in relation to notification from providers to consumers (e.g., the NOTIFY phase), only the root node or a designated auxiliary root node may stop propagation which may thereby prevent some malicious handlers from stopping event propagation. In some embodiments, for the SUB phase, only a consumer node that fired an event to a particular node may be enabled to stop propagation to the particular node through additional event handlers registered on the path. Utilization of such modification may be up to the implementation mechanism employed. In an example embodiment, the same application may be enabled to stop propagation in SUB phase, although alternatively no node can stop propagation according to information specified in the event flow for a particular topology.

An example format for a basic send event method that may be defined by the context modeler 80 will be described below by way of example and not limitation. The example basic send event method format may be as follows:

sendEvent(String eventName, Optional eventType, Node TargetNode, Optional PropertyType, Optional Name Space, Optional TypeAny eventParameters)

In some embodiments, the optional PropertyType may allow the event sender to send one event to multiple properties that may belong to the same property type if supported by the context model. The NameSpace optional attribute may allow sending of the same event to all properties satisfying the Name space. The three attributes TargetNode, PropertyType, and Namespace, can be used in conjunction with each other in order to identify a particular node (e.g., act as an indirect filter for properties).

In an exemplary embodiment, the sendEvent is always called at the origin node and creates an event structure that is passed along the predetermined path to the target node. This allows simplification of the method call as well as provides additional level of security for the model.

According to an exemplary embodiment, the event itself may include a structure comprising the following parameters:

```
{
    Enum String EventPhase : values SUB or NOTIFY
    String EventName
    Optional TypeAny eventParameters
    String OriginNode (ROOT if phase is SUB)
    String TargetNode (optional if phase is NOTIFY)
}
```

If the eventPhase is the SUB phase, the OriginNode may be optional, but OriginNode is always the ROOT node. This is so that for SUB phase, the event always originates at the ROOT node and propagates down to the TargetNode. The TargetNode in SUB phase can be given a parameter of "*" which stands for broadcast mode. In broadcast mode, all properties of the tree are notified of the event. In broadcast mode, the propagation of an event will terminate at all leaf nodes. The mode of propagation is dependent on the topology of the context model. Meanwhile, if the eventPhase is the NOTIFY phase, the TargetNode is optional, but its value is has to be ROOT node if set by the property node that fires the event. In the NOTIFY phase, a property can just fire an event that will terminate at the ROOT node or an auxiliary ROOT node. In some cases, the optional parameters and the ROOT node may also be checked to determine the phase of the corresponding event. The optional eventType may be reserved for future use where needed such as to group types of events.

In relation to event listener registration, an example format for an event listener may follow the following format:
addListener(functionCallback fnEventCallBack, String EventName, String EventPhase, Optional propertyName, Optional propertyNameSpace, Optional Boolean matchAll, Optional Boolean singleAttach)

The Boolean matchAll indicates whether the criterion is applied to all properties that match the name and namespace attributes as well as the event name and phase. If the Boolean matchAll is set to TRUE, this will attach handlers at all properties that match. If the Boolean matchAll is not set to TRUE, this will attach to the first instance found. Determination regarding the first instance found may depend on the implementation and the topology.

The Boolean singleAttach is an efficiency increasing parameter. If matchAll is set to TRUE and singleAttach is also TRUE, then instead of attaching the same eventHandler at each property, the implementation may determine the closest node in the hierarchy through which all events pass the mentioned criterion and attach a single event handler at the determined closest node. If a specific node cannot be found, the implementation may use the least common node for a set of nodes that pass the above specified criterion while attaching direct event handlers at other nodes to thereby increase the efficiency of notification.

Figure 3:
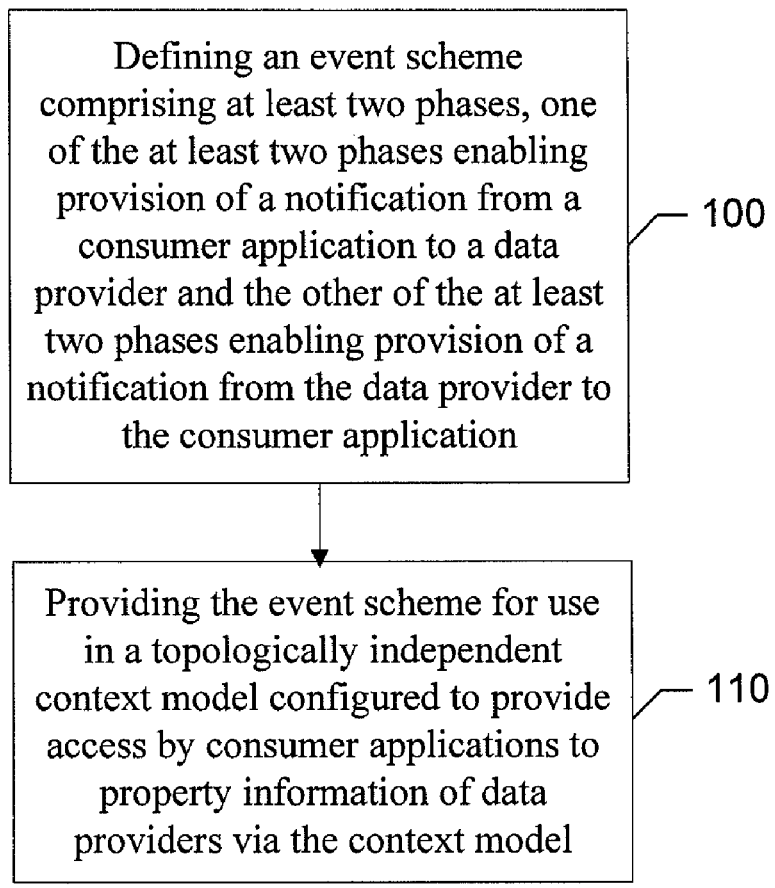
FIG. 3 is a block diagram according to an exemplary method for providing an event scheme for a context model according to an exemplary embodiment of the present invention.

FIG. 3 is a flowchart of a method and program product according to exemplary embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, a method according to one embodiment of the invention, as shown in FIG. 3, may include processor and a memory storing executable instructions that in response to execution by the processor cause the apparatus to at least perform operations including defining an event scheme comprising at least two phases at operation 100 and providing the event scheme for use in a topologically independent context model at operation 110. One of the at least two phases defined may enable provision of a notification from a consumer application to a data provider and the other of the at least two phases may enable provision of a notification from the data provider to the consumer application. The context model may be configured to provide access by consumer applications to property information of data providers via the context model.

In some embodiments, certain ones of the operations above may be modified or further amplified as described below. It should be appreciated that each of the modifications or amplifications below may be included with the operations above either alone or in combination with any others among the features described herein. In this regard, for example, providing the event scheme for use in the topologically independent context model may include providing the event scheme for use within a delivery context client interface context model associated with any one of a tree based topology, a single backbone based topology or a mixed backbone-tree based topology. In some cases, defining the event scheme for the phase enabling notification from the consumer application to the data provider may include defining the phase enabling provision of notification from a root node propagating to a bottom leaf node in a topology unless a specific property node is identified. In response to identification of the specific property node, defining the event scheme may include defining the phase enabling provision of notification to include defining enablement for event propagation through all nodes on a path to the specific property node identified and stopping event propagation at the specific property node identified. In some embodiments, defining the event scheme comprises defining a topology specific event propagation path for each respective phase. In an exemplary embodiment, defining the event scheme for the phase enabling notification from the data provider to the consumer application may include defining an auxiliary root node that stops propagation in response to the auxiliary root node being encountered along a propagation path for propagation of the notification and/or utilizing the phase by the data provider of a property to send the notification to one or more event listeners up to the consumer application of a corresponding context topology.

In an exemplary embodiment, an apparatus for performing the method of FIG. 3 above may comprise a processor (e.g., the processor 70) configured to perform some or each of the operations (100-110) described above. The processor may, for example, be configured to perform the operations (100-110) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-110 may comprise, for example, the processor 70, the context modeler 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
a processor; and
a memory including computer program code, the at least one memory and the computer program code configured to, with the processor, cause the apparatus to at least:
define an event scheme comprising at least two phases, one of the at least two phases enabling provision of a notification from a consumer application to a data provider and the other of the at least two phases enabling provision of a notification from the data provider to the consumer application, wherein the other of the at least two phases enabling provision of the notification from the data provider to the consumer application is further configured to:
define an auxiliary root node that stops propagation in response to the auxiliary root node being encountered along a propagation path for propagation of the notification;
cause a notification to be sent to one or more event listeners of a corresponding context topology; and
cause one or more multi-dimensional data spaces to be provided for one or more represented objects; and
cause the event scheme to be provided for use in a topologically independent context model configured to provide access by consumer applications to property information of data providers via the context model.

2. The apparatus of claim 1, wherein the memory including the computer program code is further configured to, with the processor, cause the apparatus to cause the event scheme to be provided for use in the topologically independent context model including causing the event scheme to be provided for use within a delivery context client interface context model associated with any one of a tree based topology, a single backbone based topology or a mixed backbone-tree based topology.

3. The apparatus of claim 1, wherein the memory including the computer program code is further configured to, with the processor, cause the apparatus to define the event scheme for the phase enabling notification from the consumer application to the data provider including defining the phase enabling provision of notification from a root node propagating to a bottom leaf node in a topology unless a specific property node is identified.

4. The apparatus of claim 3, wherein in response to identification of the specific property node, the memory including the computer program code is further configured to, with the processor, cause the apparatus to define the event scheme including defining the phase enabling provision of notification to include defining enablement for event propagation through all nodes on a path to the specific property node identified and stopping event propagation at the specific property node identified.

5. The apparatus of claim 1, wherein the memory including the computer program code is further configured to, with the processor, cause the apparatus to define the event scheme including defining a topology specific event propagation path for each respective phase.

6. The apparatus of claim 5, wherein the memory including the computer program code is further configured to, with the processor, cause the apparatus to define the event scheme to enable only the consumer application that fires an event to a particular node to stop propagation to the particular node through additional event handlers registered on the path.

7. The apparatus of claim 1, wherein the memory including the computer program code is further configured to, with the processor, cause the apparatus to define the event scheme for the phase enabling notification from the data provider to the consumer application including utilizing the phase by the data provider of a property to send the notification to one or more event listeners up to the consumer application of a corresponding context topology.

8. The apparatus of claim 1, wherein the memory including the computer program code is further configured to, with the processor, cause the apparatus to define the event scheme for enabling an event sender to send one event to multiple properties that belong to a same property type supported by the context model.

9. The apparatus of claim 1, wherein the memory including the computer program code is further configured to, with the processor, cause the apparatus to define the event scheme for enabling an event sender to send one event to multiple properties that satisfy a particular name space criteria.

10. The apparatus of claim 1, wherein the memory including the computer program code is further configured to, with the processor, cause the apparatus to define the event scheme for enabling an event sender to send one event to multiple properties that satisfy a combination of predefined parametric criteria.

11. The apparatus of claim 1, wherein the memory including the computer program code is further configured to, with the processor, cause the apparatus to define the event scheme for enabling an event sender to notify all properties in a tree structure by employing a broadcast mode.

12. A method comprising:
defining an event scheme comprising at least two phases, one of the at least two phases enabling provision of a notification from a consumer application to a data provider and the other of the at least two phases enabling provision of a notification from the data provider to the consumer application, wherein the other of the at least two phases enabling provision of the notification from the data provider to the consumer application further comprises:
defining an auxiliary root node that stops propagation in response to the auxiliary root node being encountered along a propagation path for propagation of the notification;
causing a notification to be sent to one or more event listeners of a corresponding context topology; and
causing one or more multi-dimensional data spaces to be provided for one or more represented objects; and;
causing the event scheme to be provided for use in a topologically independent context model configured to provide access by consumer applications to property information of data providers via the context model.

13. The method of claim 12, wherein causing the event scheme to be provided for use in the topologically independent context model comprises providing the event scheme for use within a delivery context client interface context model associated with any one of a tree based topology, a single backbone based topology or a mixed backbone-tree based topology.

14. The method of claim 12, wherein defining the event scheme for the phase enabling notification from the consumer application to the data provider comprises defining the phase enabling provision of notification from a root node propagating to a bottom leaf node in a topology unless a specific property node is identified.

15. The method of claim 12, wherein in response to identification of the specific property node, defining the event scheme comprises defining the phase enabling provision of notification to include defining enablement for event propagation through all nodes on a path to the specific property node identified and stopping event propagation at the specific property node identified.

16. The method of claim 12, wherein defining the event scheme for the phase enabling notification from the data provider to the consumer application comprises utilizing the phase by the data provider of a property to send the notification to one or more event listeners up to the consumer application of a corresponding context topology.

17. A computer program product comprising at least one computer-readable non-transitory storage medium having computer-executable program code instructions stored therein, the computer-executable program code instruction comprising:
program code instructions for defining an event scheme comprising at least two phases, one of the at least two phases enabling provision of a notification from a consumer application to a data provider and the other of the at least two phases enabling provision of a notification from the data provider to the consumer application, wherein the other of the at least two phases enabling provision of the notification from the data provider to the consumer application is further configured to:
define an auxiliary root node that stops propagation in response to the auxiliary root node being encountered along a propagation path for propagation of the notification;
cause a notification to be sent to one or more event listeners of a corresponding context topology; and
cause one or more multi-dimensional data spaces to be provided for one or more represented objects; and
program code instructions for causing the event scheme to be provided for use in a topologically independent context model configured to provide access by consumer applications to property information of data providers via the context model.

18. The computer program product of claim 17, wherein program code instructions for causing the event scheme to be provided for use in the topologically independent context model include instructions for providing the event scheme for use within a delivery context client interface context model associated with any one of a tree based topology, a single backbone based topology or a mixed backbone-tree based topology.

* * * * *